(12) United States Patent
Ellis et al.

(10) Patent No.: US 8,166,708 B2
(45) Date of Patent: May 1, 2012

(54) INTEGRATED GLASS RUN AND UPPER REVEAL WITH FILM

(76) Inventors: Peter J. Ellis, Rochester Hills, MI (US); Haruhisa Kawase, Rochester Hills, MI (US); Toan Ho, Royal Oak, MI (US); Malcolm Ward, Bradford (CA); Avi Zohar, Thornhill (CA)

( * ) Notice: Subject to any disclaimer, the term of this patent is extended or adjusted under 35 U.S.C. 154(b) by 0 days.

(21) Appl. No.: 12/221,031

(22) Filed: Jul. 30, 2008

(65) Prior Publication Data

US 2010/0026042 A1     Feb. 4, 2010

(51) Int. Cl.
*E06B 7/16* (2006.01)
(52) U.S. Cl. ............ 49/490.1; 49/441; 49/495.1
(58) Field of Classification Search .......... 49/440, 49/441, 475.1, 490.1, 495.1
See application file for complete search history.

(56) References Cited

U.S. PATENT DOCUMENTS

| | | | |
|---|---|---|---|
| 4,470,223 A | | 9/1984 | Mesnel |
| 4,656,784 A * | | 4/1987 | Brachmann .................. 49/490.1 |
| 5,038,521 A * | | 8/1991 | Andrzejewski et al. ........ 49/441 |
| 5,086,588 A | | 2/1992 | Nakano et al. |
| 5,095,656 A * | | 3/1992 | Keys .............................. 49/441 |
| 5,279,782 A * | | 1/1994 | Yamamoto et al. .......... 264/162 |
| 5,621,045 A | | 4/1997 | Patel et al. |
| 5,628,150 A * | | 5/1997 | Mesnel ........................... 49/440 |
| 5,743,047 A * | | 4/1998 | Bonne et al. ................ 49/490.1 |
| 6,401,397 B2 * | | 6/2002 | Klein et al. .................. 49/495.1 |
| 6,409,251 B1 * | | 6/2002 | Kaye et al. ................. 296/146.9 |
| 6,612,074 B1 * | | 9/2003 | Kaye et al. ..................... 49/441 |
| 6,679,003 B2 * | | 1/2004 | Nozaki et al. ................... 49/441 |
| 6,828,011 B2 * | | 12/2004 | Yu et al. ........................ 428/220 |
| 6,849,310 B2 * | | 2/2005 | Willett ............................. 428/31 |
| 7,026,028 B2 * | | 4/2006 | Gijsman et al. ............ 428/36.91 |
| 7,383,662 B2 * | | 6/2008 | Tamaoki ........................ 49/441 |
| 7,478,863 B2 * | | 1/2009 | Krause ....................... 296/146.2 |
| 2005/0048238 A1 * | | 3/2005 | Gijsman et al. ............ 428/36.91 |
| 2006/0223923 A1 * | | 10/2006 | Cavalli et al. ................. 524/296 |
| 2007/0262608 A1 * | | 11/2007 | Saito .......................... 296/146.7 |

FOREIGN PATENT DOCUMENTS

| | | |
|---|---|---|
| CA | 2524311 | 4/2006 |
| EP | 0587428 | 3/1994 |
| JP | 2006-007995 | 1/2006 |
| JP | 2007-083943 | 4/2007 |

OTHER PUBLICATIONS

International Search Report and Written Opinion of ISA in PCT/CA2009/001073, Oct. 13, 2009.

\* cited by examiner

*Primary Examiner* — Jerry Redman
(74) *Attorney, Agent, or Firm* — Miller Canfield

(57) ABSTRACT

An integrated reveal molding is provided for a motor vehicle door frame having a header section defining a window opening. The integrated reveal molding includes an upper reveal adapted to be mounted to the header section. The upper reveal includes a reveal surface disposed outboard of the header section. A reveal is secured along the reveal surface. The integrated reveal molding also includes a glass run co-extruded with the upper reveal. The glass run includes a window receiving channel for engagement with a window pane. The integrated reveal molding is formed as an extruded member from thermoplastic vulcanisate (TPV) of different durometer values to meet varying flexibility and durability requirements.

13 Claims, 5 Drawing Sheets

INTEGRATED GLASS RUN AND UPPER REVEAL WITH FILM

BACKGROUND OF THE INVENTION

1. Field of the Invention

The invention relates to a reveal molding for a motor vehicle door. More particularly, the invention relates to a reveal molding that integrates a glass run with an upper reveal.

2. Description of Related Art

A glass run and an upper reveal are conventionally molded as separate components that are subsequently joined when attached to a motor vehicle door. Motor vehicle doors typically include a door frame having a metal header with an outwardly extending flange. The upper reveal is secured along the flange and includes a reveal trim that is visible along an exterior of the vehicle door. The separate glass run is then fixedly secured to the upper reveal for receiving a window pane in a closed position.

Generally, it is difficult to manufacture the separate upper reveal as it tends to fail when stretch bending and it requires expensive retooling during attachment to the vehicle door. Therefore, it is desirable to develop a single, integrated reveal molding that includes a glass run and an upper reveal that are integrally connected to form a single unitary molding. Accordingly, the single molding substantially reduces retooling cost, eliminates the need for stretch bending, and reduces the number of parts and the weight of the molding.

SUMMARY OF THE INVENTION

According to one aspect of the invention, an integrated reveal molding is provided for a motor vehicle door frame having a header section and defining a window opening for receiving a window pane. The integrated reveal molding includes a glass run having a window receiving portion adapted for receiving the window pane. The window receiving portion includes a connecting body and spaced apart first and second legs extending out from the connecting body to define a window receiving channel for receiving the window pane. The integrated reveal molding also includes an upper reveal having an outboard segment adapted to be secured to the door frame. The outboard segment extends between an upper end and an opposite lower end that is fixedly connected to the second leg of the window receiving portion to define a retention channel for securely receiving the door frame. The outboard segment further includes a reveal surface disposed along the outboard segment with a reveal secured to the reveal surface to provide an aesthetically appealing appearance. The upper reveal and a portion of the second leg of the window receiving portion are formed from TPV having a durometer of approximately 40 D.

According to another aspect of the invention, an integrated reveal molding includes a main body portion with an upper segment, a lower segment, and a connecting member extending between the upper and lower segments to define a horizontal channel adapted to receive the header section. Spaced apart first and second legs are secured to and extend out from the lower segment to define a generally vertical channel for receiving the window pane. A reveal surface extends along the connecting member and one of the first and second legs. A reveal is secured to the reveal surface to provide an aesthetically pleasing appearance.

BRIEF DESCRIPTION OF THE DRAWINGS

The invention will be readily appreciated as the same becomes better understood by reference to the following detailed description when considered in connection with the accompanying drawings wherein.

DETAILED DESCRIPTION OF THE EMBODIMENTS

Figure 1:
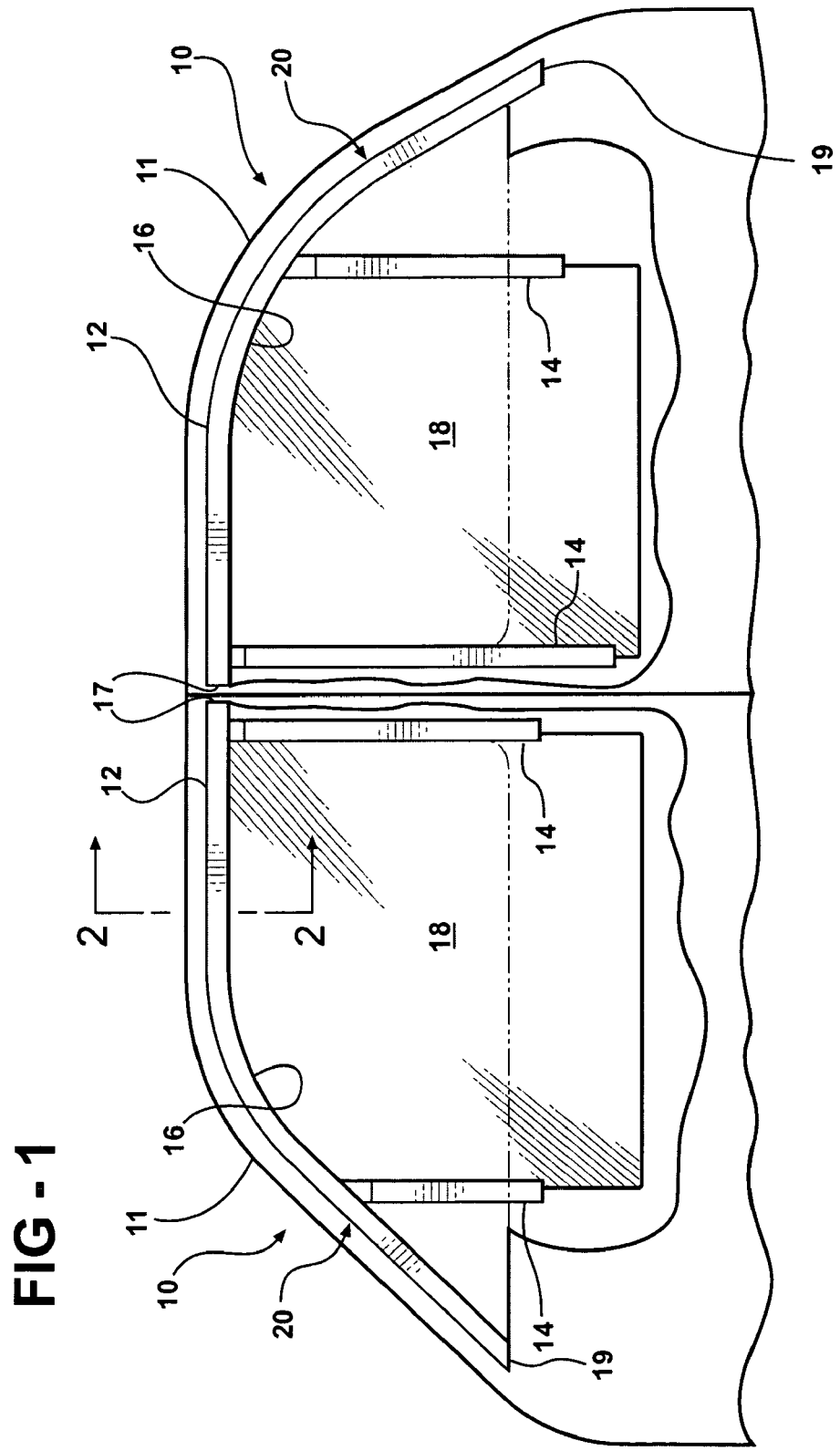
FIG. 1 is a side view of a motor vehicle front door and rear door, partially cut away, including an integrated reveal molding extending along a header section.
Figure 2:
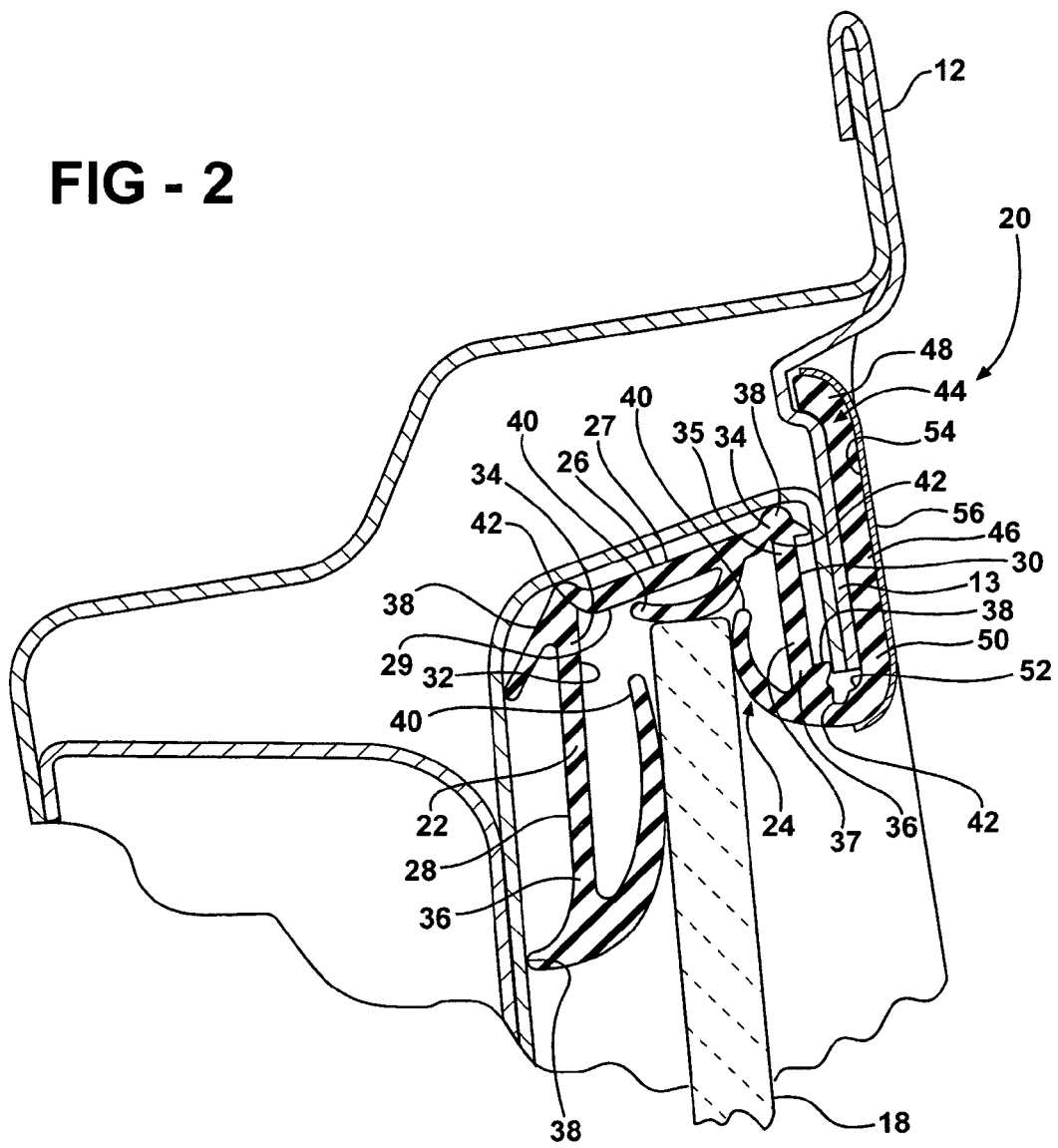
FIG. 2 is a cross-sectional view taken along Lines 2-2 in FIG. 1 of the integrated reveal molding mounted to the header section.

Referring to FIG. 1, a motor vehicle door is generally shown at 10. In FIG. 1, the door 10 is a front door and a rear door. The following description addresses the front door with the understanding that the same applies equally to the rear door. The front door 10 includes a door frame 11 having a header section 12. The header section 12 includes a flange 13 extending out therefrom, as shown in FIG. 2. The door frame 11 defines a window opening 16. A retractable window pane 18 selectively closes a portion of the window opening 16. A glass run member 14 is positioned along a division post and a B-pillar for receiving the retractable window pane 18.

An integrated reveal molding, generally shown at 20, is an elongated molding that extends longitudinally along the length of the header section 12 between a first terminating end 17 and a second terminating end 19. The integrated reveal molding 20 may be curved to match the contour of the header section 12.

Referring to FIG. 2, the integrated reveal molding 20 includes a glass run 22 having a window receiving portion, generally indicated at 24, for receiving the retractable window pane 18 therein. The window receiving portion 24 includes spaced apart first 28 and second 30 legs extending out from a connecting body 26 to define a window receiving channel 32.

Each of the first 28 and second 30 legs extends between a connecting end 34 and a free end 36. Each free end 36 includes a flexible lip 40 secured thereto. Each of the flexible lips 40 sealingly engages the retractable window pane 18. The connecting body 26 includes an upper surface 27 and a lower surface 29. An additional flexible lip 40 is secured to the lower surface 29 and projects into the window receiving channel 32.

Each connecting end 34 of the first 28 and second 30 legs and each free end 36 of the first 28 and second 30 legs include a respective projection 38 that engages and abuts the header section 12 to provide locking engagement therewith. The first leg 28 and the connecting body 26 define a hinge 42 therebetween to provide flexible movement of the first leg 28 relative to the connecting body 26. The second leg 30 and the connecting body 26 also define a hinge 42 therebetween to provide flexible movement of the second leg 30 relative to the connecting body 26.

The glass run members 14 positioned along the division post and the B-pillar, as shown in FIG. 1, have similar characteristics as the window receiving portion 24 of the glass run 22 described above. The glass run members 14 along the division post and the B-pillar are molded to the integrated reveal molding 20 to further restrict the movement of the retractable window pane 18 received therein and guide the retractable window pane 18 in the proper orientation during vertical movement.

The integrated reveal molding 20 also includes an upper reveal, generally indicated at 44, adjacent the glass run 22 and oriented in a direction generally opposite the window receiving portion 24 of the glass run 22. The upper reveal 44 includes an outboard segment 46 extending between an upper end 48 and an opposite lower end 50. The lower end 50 is fixedly secured to the second leg 30 of the window receiving portion 24. The outboard segment 46 and the second leg 30 define a retention channel 52 therebetween. The upper reveal 44 is attached to the flange 13 of the header section 12 by mounting the outboard segment 46 and second leg 30 around the flange 13 such that the flange 13 is fixedly secured within the retention channel 52. The upper reveal 44 may be fixedly mounted along the flange 13 by any of numerous known materials and methods, including, but not limited to, adhesive or tape.

The integrated reveal molding 20 is formed as an extruded member from thermoplastic vulcanisate (TPV) of different durometer values to meet varying flexibility and durability requirements. More specifically, the upper reveal 44 has a durometer of approximately 40 D. The second leg 30 of the window receiving portion 24 further includes a top portion 35 and a bottom portion 37. The bottom portion 37 is formed from TPV having a durometer of approximately 40 D. It is, however, appreciated that the durometer for the upper reveal 44 and the durometer for the bottom portion 37 may vary. The top portion 35 of the second leg 30, the connecting body 26, and the first leg 28 of the window receiving portion 24 are each generally formed from TPV having a durometer of less than approximately 40 D. It is also appreciated that the durometers for the top portion 35 of the second leg 30, the connecting body 26, and first leg 28 of the window receiving portion 24 may vary.

The integrated reveal molding 20 includes a reveal surface 54 extending along the outboard segment 46 of the upper reveal 44. A reveal 56 is coupled to the reveal surface 54 to provide the integrated reveal molding 20 with an aesthetically pleasing, finished exterior. The reveal 56 may be formed from any of numerous materials including, but not limited to, glossy chrome film and glossy black film. Because the upper reveal 44 is formed from TPV with a durometer of approximately 40 D, the upper reveal 44 provides a hard surface that allows the reveal 56 to be applied to the reveal surface 54 without wrinkling or other similar irregularities.

Figure 3:
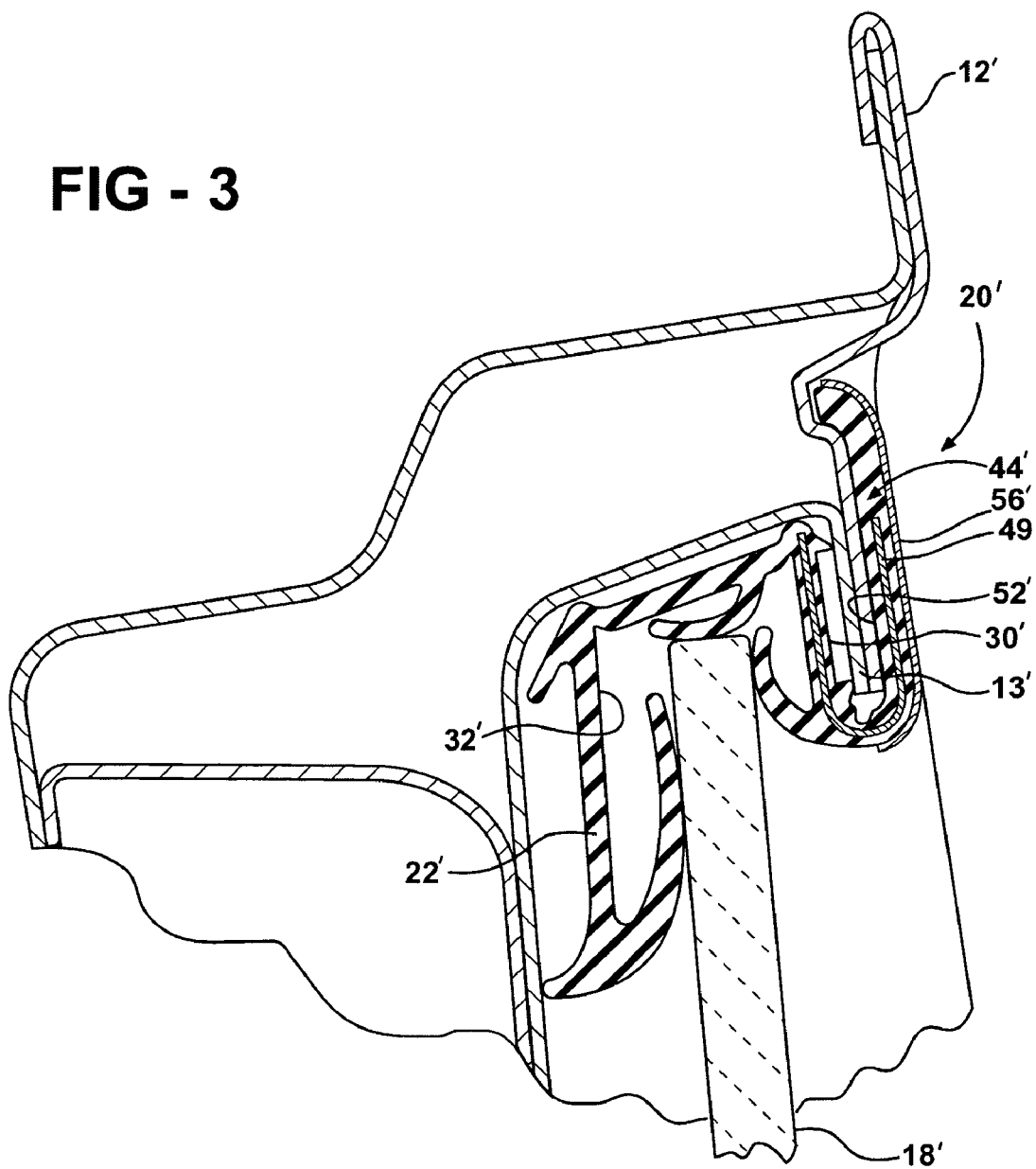
FIG. 3 is a cross-sectional view of a second embodiment of the integrated reveal molding mounted to the header section.

Referring to FIG. 3, wherein like primed reference numerals represent similar elements as discussed above, the integrated reveal molding 20' in a second embodiment includes a metal carrier 49 embedded within the upper reveal 44' and the second leg 30' of the glass run 22'. The metal carrier 49 has a generally U-shaped cross-section to provide additional support to the upper reveal 44'.

Figure 4:
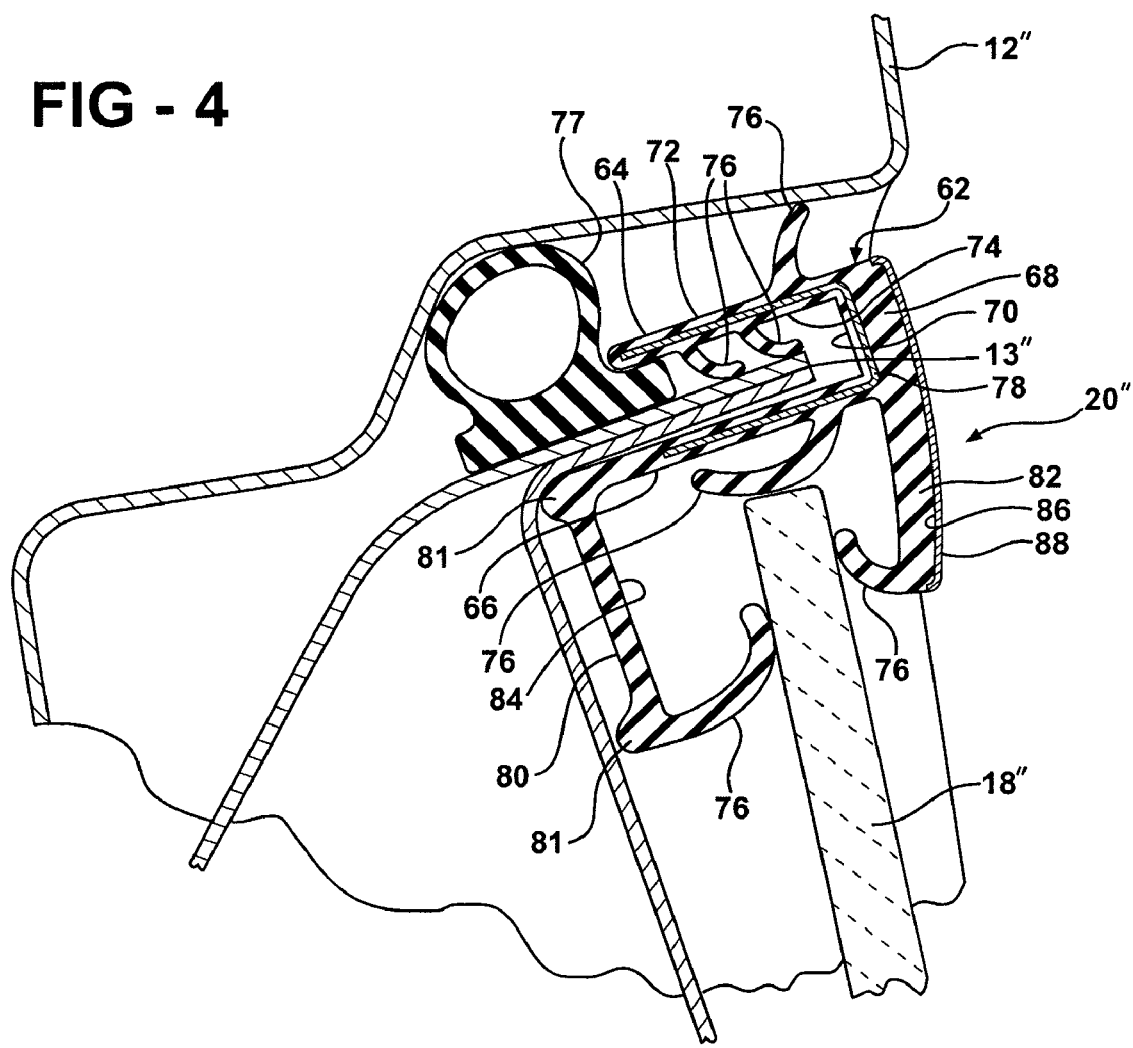
FIG. 4 is a cross-sectional view of a third embodiment of the integrated reveal molding mounted to the header section.

Referring to FIG. 4, wherein like double-primed reference numerals represent similar elements as those discussed above, an alternative embodiment of the integrated reveal molding 20" includes a main body portion, generally shown at 62, having an upper segment 64, a lower segment 66, and a connecting member 68 extending therebetween. The upper segment 64, the lower segment 66, and the connecting member 68 define a generally horizontal channel 70 that is adapted to receive the flange 13" of the header section 12". The upper segment 64 includes an upper surface 72 and a lower surface 74. The upper surface 72 has at least one flexible lip 76 secured thereto and projecting therefrom to engage the header section 12". The lower surface 74 also has at least one flexible lip 76 secured thereto and projecting into the horizontal channel 70 to engage the flange 13".

A sealing member 77 is partially disposed within the generally horizontal channel 70 of the main body portion 62 and contacts the upper segment 64 and the header section 12" for providing a continuous seal therebetween. The main body portion 62 further includes a metal carrier 78 embedded within the main body portion 62 to provide additional support thereto. The metal carrier 78 in the current embodiment has a generally U-shaped cross section.

The integrated reveal molding 20" also includes spaced apart first 80 and second 82 legs secured to the lower segment 66 of the main body portion 62 and extending therefrom to define a generally vertical channel 84 for receiving the retractable window pane 18". The first leg 80 includes projections 81 that engage and abut the header section 12" to provide locking engagement therewith. The first 80 and second 82 legs each includes a flexible lip 76 projecting into the generally vertical channel 84 for sealing engagement with the retractable window pane 18". The lower segment 66 of the main body portion 62 includes the flexible lip 76 secured thereto and projecting into the generally vertical channel 84 for sealing engagement with the retractable window pane 18".

A reveal surface 86 extends along the connecting member 68 of the main body portion 62 and one of the first 80 and second legs 82. A reveal 88 is secured to the reveal surface 86 to provide the integrated reveal molding 20" with an aesthetically pleasing appearance. The reveal 88 may be formed from any of numerous materials including, but not limited to, glossy chrome film and glossy black film. The integrated reveal molding 20" is formed as an extruded member from TPV of different durometer values to meet varying flexibility and durability requirements.

Figure 5:
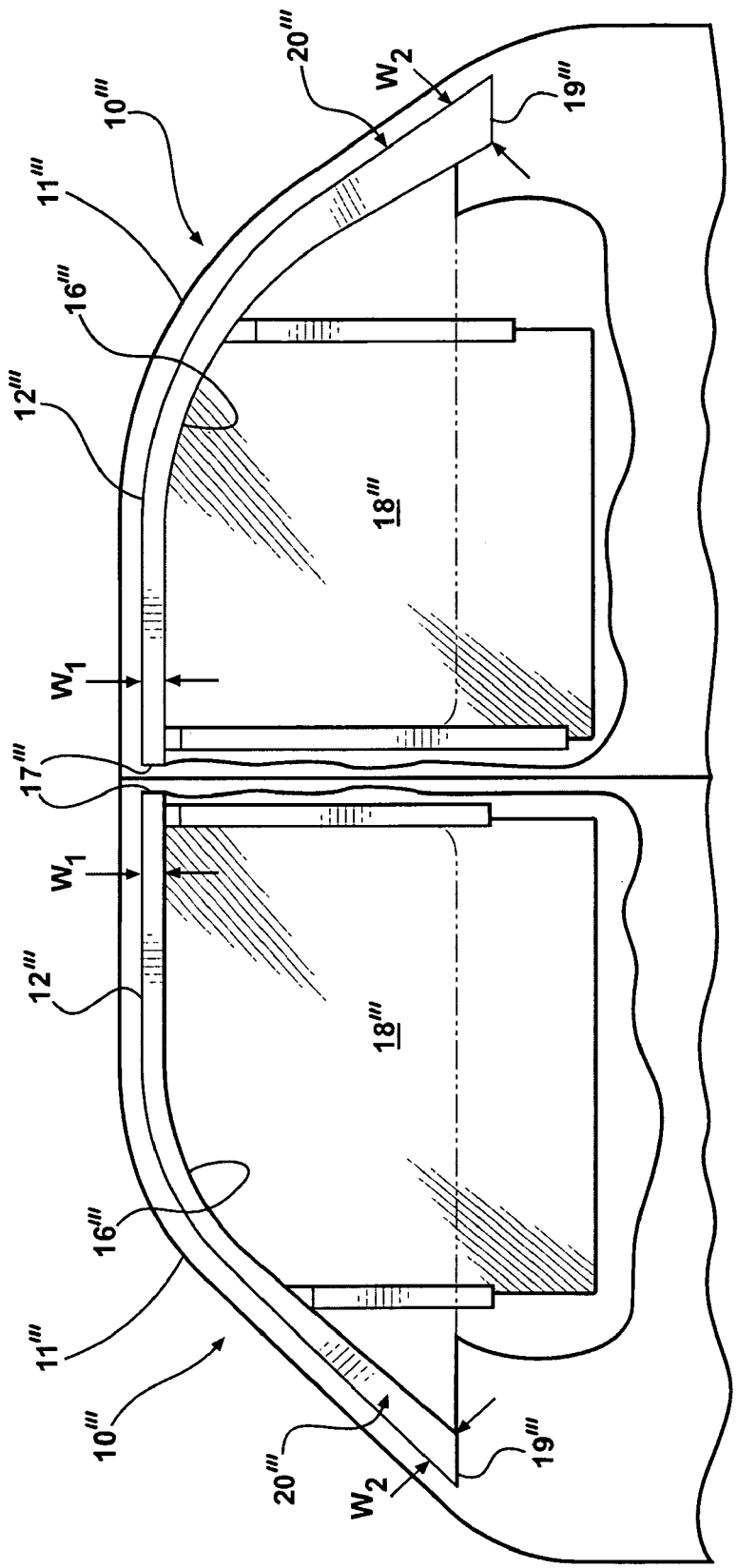
FIG. 5 is a side view of a motor vehicle front door and rear door, partially cut away, including a fourth embodiment of the integrated reveal molding extending along a header section.

Referring to FIG. 5, wherein like triple-primed reference numerals represent similar elements as those discussed above, a fourth embodiment of the integrated reveal molding 20''' extends longitudinally along the length of the header section 12''' and has a width $W_1$ at the first terminating end 17''' and a width $W_2$ at the second terminating end 19'''. As the integrated reveal molding 20''' extends longitudinally along the length of the header section 12''', the integrated reveal molding 20''' varies in such a way that the width $W_2$ at the second terminating end 19''' is greater than the width $W_1$ at the first terminating end 17'''. It is contemplated that the width $W_1$ at the first terminating end 17''' could be greater than the width $W_2$ at the second terminating end 19'''. It is further contemplated that a width (not shown) between the first 17''' and second 19''' terminating ends could be greater than the widths $W_1$ and $W_2$ without exceeding the scope of the invention.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. An integrated reveal molding for a motor vehicle door frame having a header section and defining a window opening for receiving a window pane therein, said integrated reveal molding comprising:

a glass run having a window receiving portion adapted for receiving the window pane, said window receiving portion including a connecting body and spaced apart first and second legs extending out therefrom to define a window receiving channel adapted for receiving the window pane therein, wherein said window receiving channel opens in a first direction, said second leg including a bottom portion, and wherein each of said first and second legs extend between a connecting end abutting said connecting body and a free end, each of said connecting ends and said free ends of said first and second legs including a respective projection which engages the header section to provide locking engagement therewith when said integrated reveal molding is attached to the motor vehicle door frame;

an upper reveal having an outboard segment adapted to be secured to the door frame, said outboard segment abutting said bottom portion of said second leg to define a retention channel between said outboard segment and said second leg adapted for receiving the door frame securely therein, wherein said retention channel opens in a second direction opposite to said first direction of said window receiving channel such that said second leg is disposed laterally between said window receiving channel and said retention channel, said outboard segment including a reveal surface disposed therealong; and a reveal secured to said reveal surface of said outboard segment for providing an aesthetically appealing appearance therealong.

2. An integrated reveal molding as set forth in claim 1 wherein said second leg of said glass run includes a top portion, said top portion of said second leg, said connecting body, and said first leg of said glass run are each generally formed from thermoplastic vulcanisate having a durometer of less than 40 D.

3. An integrated reveal molding as set forth in claim 2 wherein each of said first and second legs of said glass run includes a flexible lip adapted for sealing engagement with the window pane.

4. An integrated reveal molding as set forth in claim 3 wherein said connecting body includes a flexible lip secured thereto and extending into said window receiving channel adapted for sealing engagement with the window pane.

5. An integrated reveal molding as set forth in claim 4 including a metal carrier embedded within said upper reveal.

6. An integrated reveal molding for a motor vehicle door frame having a header section and defining a window opening for receiving a window pane therein, said integrated reveal molding comprising:

a glass run having a window receiving portion adapted for receiving the window pane, said window receiving portion including a connecting body and spaced apart first and second legs extending out therefrom to define a window receiving channel adapted for receiving the window pane therein, said second leg including a bottom portion and opposite first and second sides, wherein said first side of said second leg is disposed in said window receiving channel, and wherein each of said first and second legs extend between a connecting end abutting said connecting body and a free end, each of said connecting ends and said free ends of said first and second legs including a respective projection which engages the header section to provide locking engagement therewith when said integrated reveal molding is attached to the motor vehicle door frame;

an upper reveal having an outboard segment abutting said bottom portion of said second leg of said window receiving portion, said outboard segment and said second leg defining a retention channel therebetween adapted for receiving the door frame securely therein, wherein said second side of said second leg is disposed in said retention channel; and a reveal secured solely to said outboard segment of said upper reveal for providing an aesthetically appealing appearance therealong.

7. An integrated reveal molding as set forth in claim 6 including a metal carrier embedded within said upper reveal.

8. An integrated reveal molding for a motor vehicle door frame having a header section and defining a window opening for receiving a window pane therein, said integrated reveal molding comprising:

a glass run having a window receiving portion adapted for receiving the window pane, said window receiving portion including a connecting body and spaced apart first and second legs extending out therefrom to define a window receiving channel adapted for receiving the window pane therein, wherein each of said first and second legs extend between a connecting end abutting said connecting body and a free end, each of said connecting ends and said free ends of said first and second legs including a respective projection which engages the header section to provide locking engagement therewith when said integrated reveal molding is attached to the motor vehicle door frame;

an upper reveal having an outboard segment fixedly connected to said second leg of said window receiving portion, said outboard segment and said second leg defining a retention channel therebetween adapted for receiving the door frame securely therein; and a reveal coupled to said outboard segment of said upper reveal for providing an aesthetically appealing appearance therealong.

9. An integrated reveal molding as set forth in claim 8 including a metal carrier embedded within said upper reveal.

10. An integrated reveal molding as set forth in claim 9 wherein each of said first and second legs of said glass run includes a flexible lip adapted for sealing engagement with the window pane.

11. An integrated reveal molding as set forth in claim 10 wherein said connecting body includes a flexible lip secured thereto and extending into said window receiving channel adapted for sealing engagement with the window pane.

12. An integrated reveal molding as set forth in claim 6 wherein each of said first and second legs of said glass run includes a flexible lip adapted for sealing engagement with the window pane.

13. An integrated reveal molding as set forth in claim 6 wherein said connecting body includes a flexible lip secured thereto and extending into said window receiving channel adapted for sealing engagement with the window pane.

* * * * *